United States Patent [19]

Sudo et al.

[11] Patent Number: 5,714,928
[45] Date of Patent: Feb. 3, 1998

[54] SYSTEM FOR PREVENTING COLLISION FOR VEHICLE

[75] Inventors: Tsugio Sudo; Takao Nagai, both of Kanagawa-ken, Japan

[73] Assignee: Kabushiki Kaisha Komatsu Seisakusho, Tokyo, Japan

[21] Appl. No.: 635,284

[22] Filed: Apr. 19, 1996

Related U.S. Application Data

[63] Continuation of Ser. No. 165,917, Dec. 14, 1993, abandoned.

[30] Foreign Application Priority Data

Dec. 18, 1992 [JP] Japan ................................. 4-086988
Jul. 20, 1993 [JP] Japan ................................. 5-178806

[51] Int. Cl.[6] ........................................... B60R 1/00
[52] U.S. Cl. ..................... 340/436; 340/435; 340/438; 340/439; 340/903; 340/904

[56] References Cited

U.S. PATENT DOCUMENTS 5,177,462  1/1993  Kajiwara ........................ 340/435

FOREIGN PATENT DOCUMENTS

63-155307  6/1988  Japan .

*Primary Examiner*—Jeffery Hofsass
*Assistant Examiner*—Daryl C. Pope
*Attorney, Agent, or Firm*—Nikaido, Marmelstein, Murray & Oram LLP

[57] ABSTRACT

A collision preventing system for a vehicle has a brake system. The system includes first preview sensor detecting an obstacle in front of the vehicle in a first distal detection zone to produce a first signal indicative of presence of the obstacle and distance between the obstacle and the front end of the vehicle, and a second preview sensor detecting the obstacle in front of the vehicle in a second proximal detection zone to produce a second signal indicative of at least presence of the obstacle. The system further includes third vehicle speed sensor detecting vehicular traveling speed and generating a vehicle speed indicative signal. A control unit is connected to the first and second preview sensor for receiving the first and second signals. The control unit is responsive to the first signal for deriving vehicular deceleration pattern for stopping the vehicle without colliding on the obstacle on the basis of the distance between the obstacle and the front end of the vehicle and the vehicle speed indicated by the vehicle speed indicative signal, and responsive to the second signal for operating the brake system for instant stop of the vehicle.

19 Claims, 8 Drawing Sheets

SYSTEM FOR PREVENTING COLLISION FOR VEHICLE

This application is a continuation of application Ser. No. 08/165,917 filed Dec. 14, 1993 now abandoned.

BACKGROUND OF THE INVENTION

1. Field of the Invention

The present invention relates generally to a system for preventing collision of a vehicle. More specifically, the invention relates to an obstacle detection system for an unattended operation vehicle, such as unattendedly operated tipper or dumper running in a construction site or so forth.

2. Description of the Related Art

Some of construction vehicle, industrial vehicle or so forth, have been adapted for unattended operation. Such type of vehicle is provided with an obstacle detecting system employing a preview sensor system. For instance, Japanese Unexamined Patent Publication No. 63-155307 discloses an obstacle monitoring system for an unattended self-traveling body, such as a tipper or so forth.

Although the above-mentioned prior art permits vehicular traveling control with avoiding collision of the vehicle to the obstacle, there is rooms to improve for optimizing vehicular traveling performance and for avoiding error in detection of the obstacle.

SUMMARY OF THE INVENTION

Therefore, it is an object of the present invention to provide a collision preventing system for a vehicle, such as an unattended vehicle, which can optimize vehicular traveling performance with certainly by avoiding collisions of the vehicle with an obstacle.

Another object of the invention is to provide a collision preventing system for a vehicle, which can avoid erroneous detection of the obstacle due to undulation of the ground surface.

In order to accomplish the above-mentioned and other objects, a collision preventing system for a vehicle having a brake system, in accordance with one aspect of the invention, comprises:

first preview sensor means provided at the front end of a vehicular body for detecting an obstacle in front of the vehicle in a first distal detection zone, the first preview sensor means producing a first signal indicative of presence of the obstacle and distance between the obstacle and the front end of the vehicle;

second preview sensor means provided at the front end of the vehicular body for detecting the obstacle in front of the vehicle in a second proximal detection zone, the second preview sensor means producing a second signal indicative of at least the presence of the obstacle;

third vehicle speed sensor means for detecting vehicular traveling speed and generating a vehicle speed indicative signal; and control means connected to the first and second preview sensor means for receiving the first and second signals, responsive to the first signal for deriving vehicular deceleration pattern for stopping the vehicle, without colliding with the obstacle, on the basis of the distance between the obstacle and the front end of the vehicle and the vehicle speed indicated by the vehicle speed indicative signal, and responsive to the second signal for operating the brake system for instantly stopping of the vehicle.

According to another aspect of the invention, an obstacle detection system for a vehicle comprises:

preview sensor means provided at the front end of a vehicular body for detecting an obstacle in front of the vehicle, the preview sensor means producing a detection signal indicative of a distance to the detected obstacle;

means for monitoring traveling distance of the vehicle; and means for distinguishing the obstacle from up-hill ground on the basis of a variation of the distance to the obstacle relative to the vehicular traveling distance causing the variation, the distinguishing means producing an obstacle detection signal when a difference between the magnitude of variation of the distance to the obstacle and the vehicular traveling distance exceeds a predetermined value.

According to a further aspect of the invention, an obstacle detection system for a vehicle comprises:

preview sensor means provided at the front end of a vehicular body for detecting an obstacle in front of the vehicle, the preview sensor means including a first sensor positioned at a first higher elevation and a second sensor positioned at a second lower elevation, the first and second sensors independently detecting obstacles for producing first and second obstacle distance signals indicative of the respective distance to the obstacle; and means for comparing the first and second obstacle distance signals for distinguishing the obstacle from an up-hill ground, the comparing means producing an obstacle detection signal when a difference between the first and second obstacle distance signals is less than a predetermined value.

According to a still further aspect of the invention, a collision preventing system for a vehicle having a brake system, comprises:

first preview sensor means provided at the front end of a vehicular body for detecting an obstacle in front of the vehicle in a first distal detection zone, the first preview sensor means producing a first signal indicative of the presence of the obstacle and distance between the obstacle and the front end of the vehicle;

second preview sensor means provided at the front end of the vehicular body for detecting the obstacle in front of the vehicle in a second proximal detection zone, the second preview sensor means producing a second signal indicative of at least the presence of the obstacle;

third vehicle speed sensor means for detecting vehicular traveling speed and generating a vehicle speed indicative signal;

control means connected to the first and second preview sensor means for receiving the first and second signals, responsive to the first signal for deriving a vehicular deceleration pattern for stopping the vehicle without colliding on the obstacle on the basis of the distance between the obstacle and the front end of the vehicle and the vehicle speed indicated by the vehicle speed indicative signal, and responsive to the second signal for operating the brake system for instant stop of the vehicle; and means for distinguishing an up-hill in front of the vehicle from the obstacle on the basis of difference to detected distance to the obstacle at different positions The distinguishing means may be incorporated in the first preview sensor means, which may comprise:

a preview sensor means for detecting an obstacle in front of the vehicle, the preview sensor means producing a detection signal indicative of a distance to the detected obstacle;

means for monitoring a traveling distance of the vehicle; and means for distinguishing the obstacle from up-hill ground on the basis of a variation of the distance to the obstacle relative to the vehicular traveling distance causing the variation, the distinguishing means producing an obstacle detection signal when a difference between the magnitude of the variation of the distance to the obstacle and the vehicular traveling distance exceeds a predetermined value.

Alternatively, the distinguishing means may comprise:

preview sensor means provided at the front end of a vehicular body for detecting an obstacle in front of the vehicle, the preview sensor means including a first sensor positioned at a first higher elevation and a second sensor positioned at a second lower elevation, the first and second sensors independently detecting obstacles for producing first and second obstacle distance signals indicative of respective distance to the obstacle; and means for comparing the first and second obstacle distance signals for distinguishing the obstacle from an up-hill ground, the comparing means producing an obstacle detection signal when a difference between the first and second obstacle distance signals is less than a predetermined value.

In the preferred construction, the collision preventing system may further comprise a fourth touch sensor means projecting from the front end of the vehicular body for detecting obstacle contacting thereto and producing a contacting obstacle detection signal, and the control means is responsive to the contacting obstacle detection signal for operating the brake system for an instant stop.

The first distal detection zone of the first preview sensor means may be elongated in the longitudinal direction of the vehicle and have a narrower lateral width than the width of the vehicular body.

The first preview sensor means may employ a laser beam diffused over the first distal detection zone as a detecting medium.

On the other hand, the second proximal zone of the second preview sensor is elongated in the lateral direction in the area near the front end of the vehicle. The second preview sensor may employ an ultrasonic wave spread over the second proximal detection zone as a detection medium.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
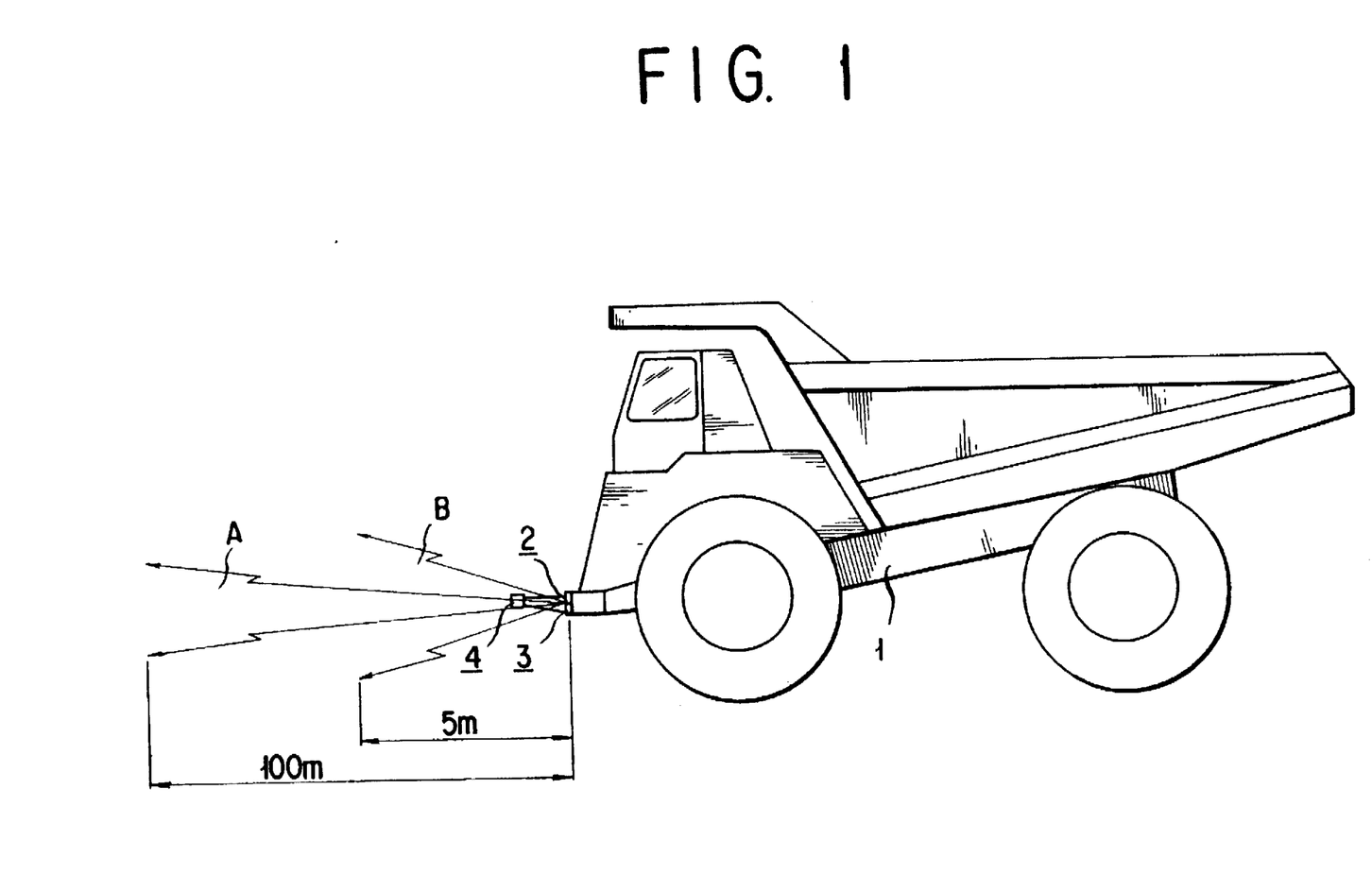
FIG. 1 is a side elevation of a tipper, to which the preferred embodiment of a collision preventing system according to the present invention is employed.
Figure 2:
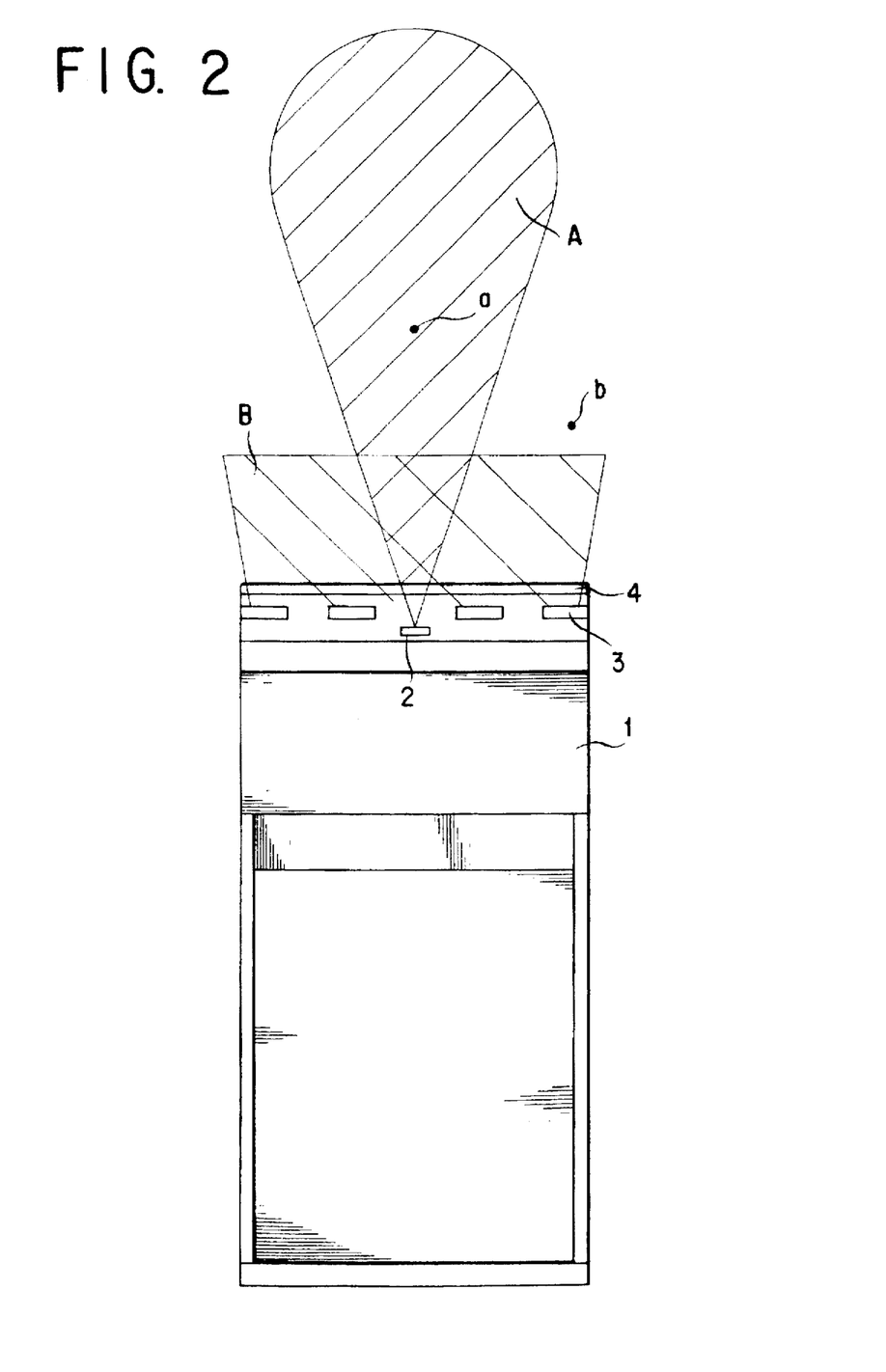
FIG. 2 is an explanatory and somewhat diagrammatic plan view showing preview areas of obstacle detecting system of the preferred embodiment of the collision preventing system.
Figure 3:
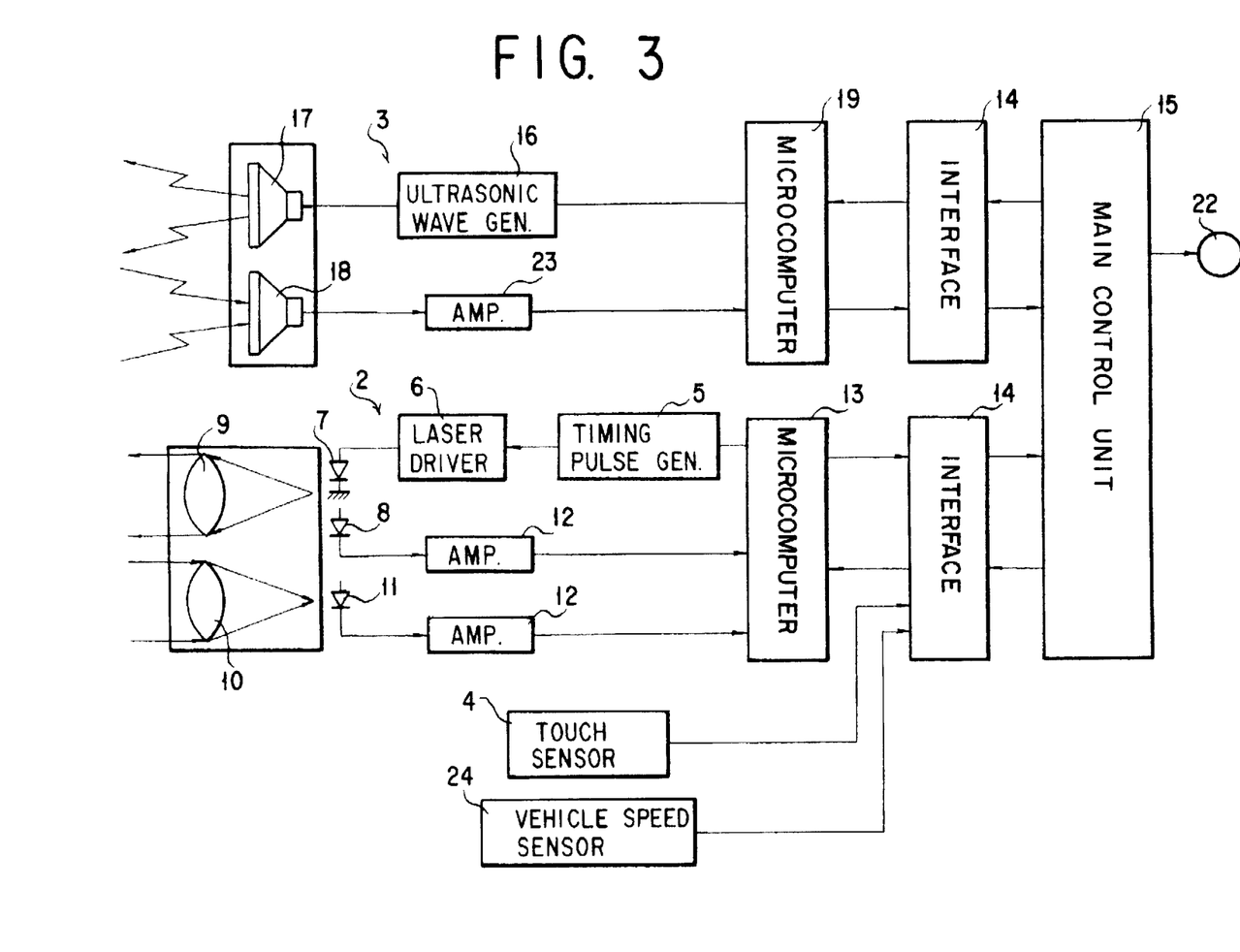
FIG. 3 is a schematic block diagram of the preferred embodiment of the collision preventing system according to the present invention.

Referring now to the drawings, particularly to FIGS. 1 and 2, there is illustratively shown a vehicle, such as a tipper, which is adapted to unattended operation. The vehicle is provided with a first preview sensor unit 2 as a first obstacle detector, a second preview sensor unit 3 as a second obstacle detector and a touch sensor 4 at the front end of a vehicle body 1. The first preview sensor unit 2 is designed to detect an obstacle by means of a laser beam. Therefore, the first preview sensor unit 2 comprises a timing pulse generator 5, a semiconductor laser driver 8, a semiconductor laser 7, a photosensitive element 8, a light transmitting lens 9, a light receiving lens 10, a photosensitive element 11 and an amplifier 12, as shown in FIG. 3. A microcomputer 13 as a laser control unit, feeds a laser control signal to the timing pulse generator 5 for driving the semiconductor laser 7 via the semiconductor laser driver 6. A laser beam thus generated is irradiated to the front side of the vehicle via the light transmitting lens 9. The photosensitive element 8 detects the laser beam emitted from the semiconductor laster 7 to input a transmitted laser indicative signal to the microcomputer 13 via the amplifier 12. The microcomputer 13 detects a laser transmitting timing on the basis of rising of the transmitted laser indicative signal. On the other hand, the light receiving lens 10 receives a reflected laser beam from an obstacle and focus the reflected laser beam to the photosensitive element 11. The photosensitive element 11 produces a reflected laser indicative signal. The photosensitive element 11 inputs the reflected laser indicative signal to the microcomputer 13 via the amplifier 12. The microcomputer 13 detects the reflected laser reception timing on the basis of rising of the reflected laser indicative signal. The microcomputer 13 then derives a distance to the obstacle on the basis of an elapsed time from the laser transmitting timing to the reflected laser detection timing. The microcomputer 13 is connected to a main controller unit 15 via an interface 14 for feeding a first obstacle detection signal $O_L$ and a first obstacle distance indicative signal $D_L$ indicative of the distance between the front end of the vehicular body 1 and the detected obstacle. In the shown embodiment, the first obstacle detection signal $O_L$ is HIGH level when the obstacle is detected and otherwise held LOW level.

As shown in FIG. 2, first preview sensor unit 2 is adapted to irradiate the laser beam within a first obstacle detection zone A. As can be seen, the first obstacle detection zone A reaches a relatively long distance from the front end of the vehicle body 1 but spread into a relatively narrow lateral width. In the illustrative embodiment, the laser beam is irradiated in the longitudinal distance of 1.0 m~100 m from the front end of the vehicle body 1. Therefore, in the following disclosure and claims, the first preview sensor unit 2 will be occasionally referred to as "long distance preview sensor unit".

The second preview sensor unit 3 is adapted to detect the obstacle by means of an ultrasonic wave. Therefore, the second preview sensor unit 3 comprises an ultrasonic wave generator 16, an ultrasonic wave transmitter 17 and an ultrasonic wave receiver 18. The ultrasonic wave generator 16 is controlled by a microcomputer 19 as an ultrasonic wave control unit for generating the ultrasonic wave at a controlled ultrasonic wave transmission timing. The ultrasonic wave receiver 18 receives a reflected ultrasonic wave from the obstacle to feed an ultrasonic wave reception signal to the microcomputer 19 via an amplifier 23. The microcomputer 19 derives a distance to the obstacle on the basis of an elapsed time between the transmission timing of the ultrasonic wave and the reception timing of the reflected ultrasonic wave. The microcomputer 19 connected to the main control unit 15 via the interface 14 for feeding a second obstacle detection signal $O_S$ and a second obstacle distance data $D_S$ indicative of the distance from the front end of the vehicular body 1. The second obstacle detection signal $O_S$ becomes HIGH level when the obstacle is detected and is otherwise held at LOW level.

As can be seen from FIG. 2, the second preview sensor unit 3 is provided with a detection zone B at a proximal area, i.e. 0.5 m~5 m from the front end of the vehicle body 1 with wider lateral area than the lateral width of the vehicular body. Therefore, the second preview sensor unit 3 will be occasionally referred to as "short distance preview sensor unit" in the following disclosure and appended claims.

It should be appreciated that the long distance preview sensor unit 2 may detect a laser beam reflective obstacle. On the other hand, the short distance preview sensor unit 3 may detect an ultrasonic wave reflective obstacle.

Figure 4:
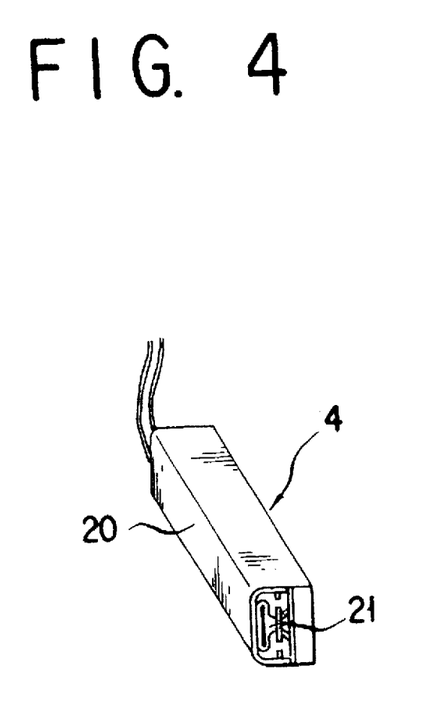
FIG. 4 is a perspective view of a touch sensor to be employed in the preferred embodiment of the collision preventing system of the invention.

One typical example of the touch sensor 4 is illustrated in FIG. 4. As shown, in the shown embodiment, the touch sensor 4 comprises an elongated detection plate 20 and a switch 21. As can be seen from FIG. 2, the touch sensor 4 extends through overall width of the vehicular body 1. The touch sensor 4 may detect anything contacting thereto to produce a contacting obstacle detection signal $D_O$.

The main control unit 15 is further connected to a vehicle speed sensor 24 for producing a vehicle speed signal V representative of the instantaneous vehicle traveling speed. With respect to the vehicle speed sensor 24 any known construction of sensors may be employed. Also, the main control unit 15 is connected to a brake system 22 for controlling the operation thereof.

As in the typical tipper or other vehicles adapted for unattended operation, manual operation by a driver is performed in the normal manner. As well, the unattendedly operated vehicle may perform known activities by remote control or by executing preliminarily set operation program. Since these operations are well known in the art, the following discussion for the operation will be concentrated to the particular collision preventive control for the unattendedly operated vehicle.

Figure 5:
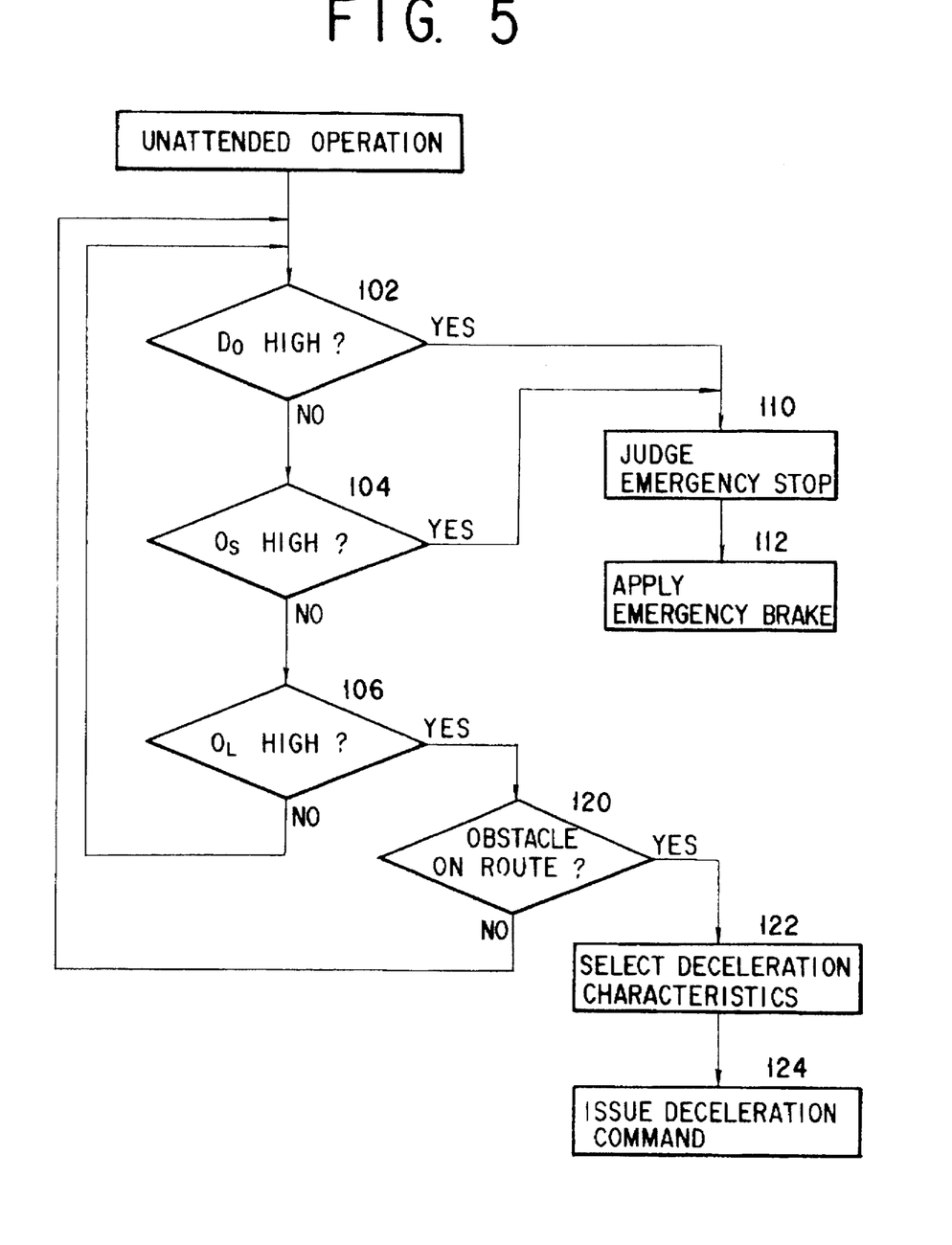
FIG. 5 is a flowchart showing a collision preventing control routine to be executed by a main controller employed in the collision preventing system of FIG. 3.

In order to perform control, the main control unit 15 periodically or cyclically executes a routine illustrated in FIG. 5.

In the shown routine, at a step 102, the main control unit 15 checked the contacting obstacle detection signal $D_O$ input from the touch sensor 4. When the contacting obstacle detection signal $D_O$ from the touch sensor 4 is HIGH level, it is an indication that some obstacle is contacting on the touch sensor 4. In such case, the process is branched to a step 110 to make the judgement for an emergency stop. Then, at a step 112, an emergency brake is applied to instantly stop the vehicle.

On the other hand, if the contacting obstacle detection signal $D_O$ from the touch sensor 14 is held LOW level indicating that nothing is contacting on the touch sensor 4 as checked at the step 102, then, the process is advanced to a step 104, in which a check is performed whether the second obstacle detection signal $O_S$ is HIGH level or not. If the HIGH level second obstacle detection signal $O_S$ is detected as checked at the step 104, the process is branched to the step 110 for performing the emergency stop operation through the steps 110 and 112.

If the second obstacle detection signal $O_S$ is held LOW level as checked at the step 104, the process is advanced to a step 106. At the step 106, a check is performed whether the first obstacle detection signal $0_L$ is HIGH level or not. If the first obstacle detection signal $O_L$ is HIGH level, then, the process is branched to a step 120, in which case discrimination is made whether the obstacle is present on a programmed traveling route or not, on the basis of the distance to the obstacle represented by the first obstacle distance indicative signal $D_l$ and the programmed route. If the first obstacle detection signal $O_L$ is held LOW level as checked at the step 106 or the detected obstacle is positioned out of the traveling route as checked at the step 120, the process returns to the initial step 102.

On the other hand, when the obstacle on the traveling route is detected at the step 120, reference is made to a preliminarily set vehicle speed map at a step 422 in terms of the distance to the obstacle indicated by the first obstacle distance indicative signal $D_L$ and the vehicle traveling speed indicated by the vehicle speed signal V. Then, in accordance with a selected deceleration characteristics of the vehicle, a deceleration command is issued for controlling the brake system 22 in normal deceleration and stop, at a step 124.

It should be appreciated that the vehicle speed map may be established for decelerating and stop the vehicle in terms of the current vehicle speed and the distance to the obstacle. Namely, a shorter distance to the obstacle and higher vehicle speed requires higher deceleration for stopping the vehicle without causing collision. Additional parameter or parameters, such as loaded condition and unloaded condition of the vehicle, friction coefficient on the route or so forth, may be employed for further precise vehicle speed control. Also, the braking force to be exerted on the vehicle by the brake system may be feedback controlled for achieving target vehicle speed at respective distance to the obstacle.

As can be appreciated herefrom, the shown embodiment provides redundancy in detection of the obstacle at three different detection zones, i.e. the first, long distance detection zone A, the second short distance detection zone B and contacting zone. Such redundancy assures prevention of collision of the vehicle to the obstacle.

Figure 6:
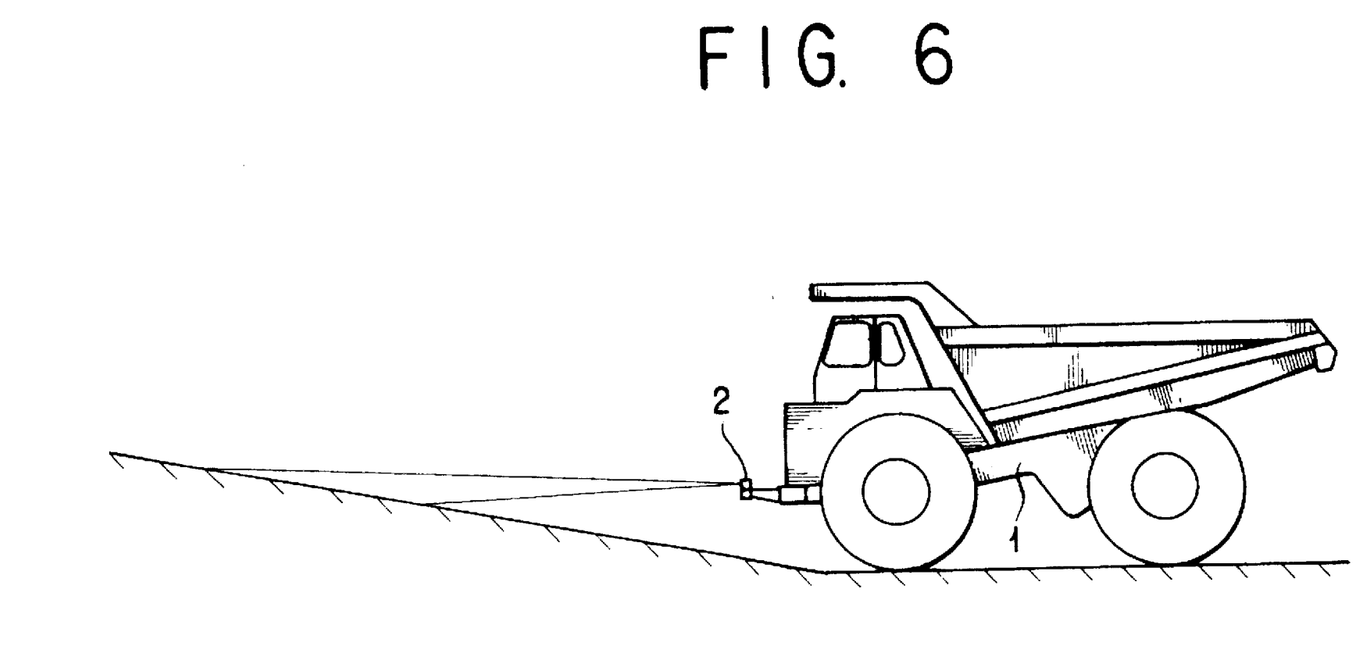
FIG. 6 is a side elevation of the tipper employing the preferred embodiment of the collision preventing system, which is reaching the end of a up-hill.

In the collision preventing system, the preview sensor unit serving as an obstacle detector can cause erroneous detection of the obstacle due to undulation on the traveling route. For instance, as shown in FIG. 6, when the vehicle reaches the bottom of the up-hill where the ground elevation is rising toward the traveling direction, the risen ground tends to be detected as obstacle, since the vehicular body 1 is maintained substantially horizontal so that the axis of the laser beam to be transmitted from the laser beam type preview sensor is held substantially horizontal. Such erroneous detection of the obstacle clearly degrade traveling performance of the vehicle and thus should be avoided.

Figure 7A:
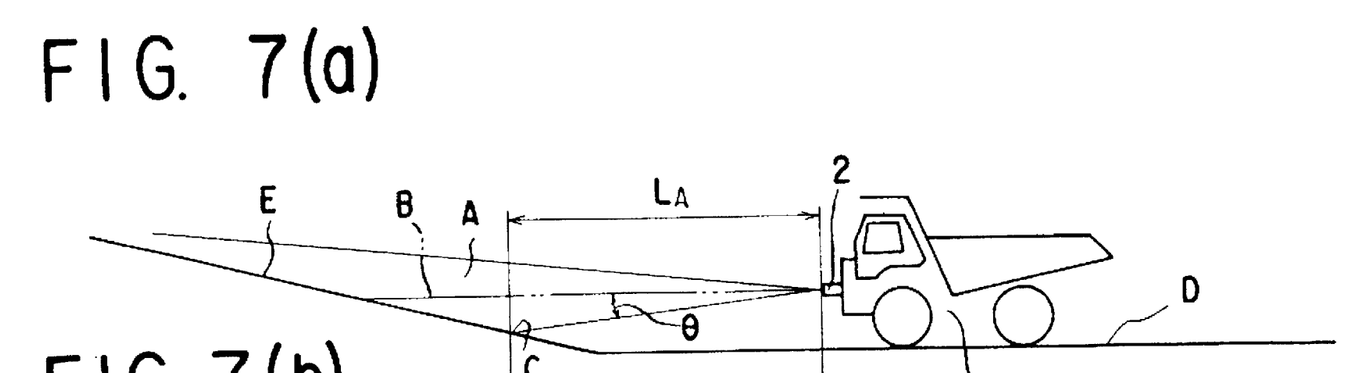
FIGS. 7(a) and 7(b) are explanatory illustration showing manner of detection of up-hill by means of the preview sensor system.

As shown in FIG. 7(a), the laser beam A is diffused below a substantially horizontal beam axis B in an angular range of $\theta$. Then, the lower boundary of the laser beam A should at first contact at a point C on the slopped surface E of the ground and be reflected toward the preview sensor 2. Then, from the preview sensor 2, a distance from the front end of the vehicular body 1 to the point C is detected. As can be appreciated, in the case of the obstacle on the horizontal ground, the distance from the vehicle to the obstacle is reduced in the corresponding distance to the traveling distance of the vehicle. Namely, the distance to the obstacle becomes shorter in the corresponding distance of travel of the vehicle.

However, in the case of point C on the slopped surface, the distance to be shortened does not correspond to the traveling distance of the vehicle. Namely, assuming that the distance from the front end of the vehicle 1 to the point C on the slopped ground is $L_A$ at the vehicle position illustrated in FIG. 7(a), and the vehicle travels for a distance X to reach the position illustrated in FIG. 7(b), a distance $L_B$ becomes longer than the distance $L_A - X$ in the extent of $\Delta L$. This is because the laser reflecting point C is moved forward due to reduction of offset of the lower boundary of the laser beam from the beam axis according to approaching of the vehicle to the bottom of the slop E.

Figure 7B:
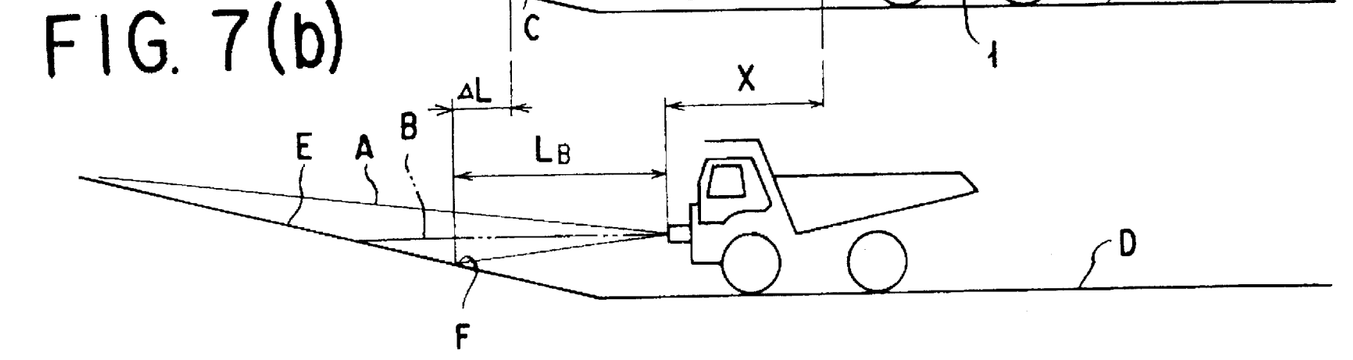

Therefore, by monitoring the variation of the distance to the obstacle in relation to the vehicular traveling distance, the slopped ground and the obstacle can be distinguished. Therefore, by making a distinction of the obstacle and the slopped ground, erroneous detection of the obstacle can be successfully avoided.

It will be possible that the controller 15 periodically samples the distance to derive an inclination of slop angle relative to a horizontal plane and makes discrimination of the obstacle from the slopped surface on the basis of the derived slop angle. Namely, in this case, the obstacle will be judged when the slop angle is greater than a predetermined obstacle detecting criterion.

Figure 8:
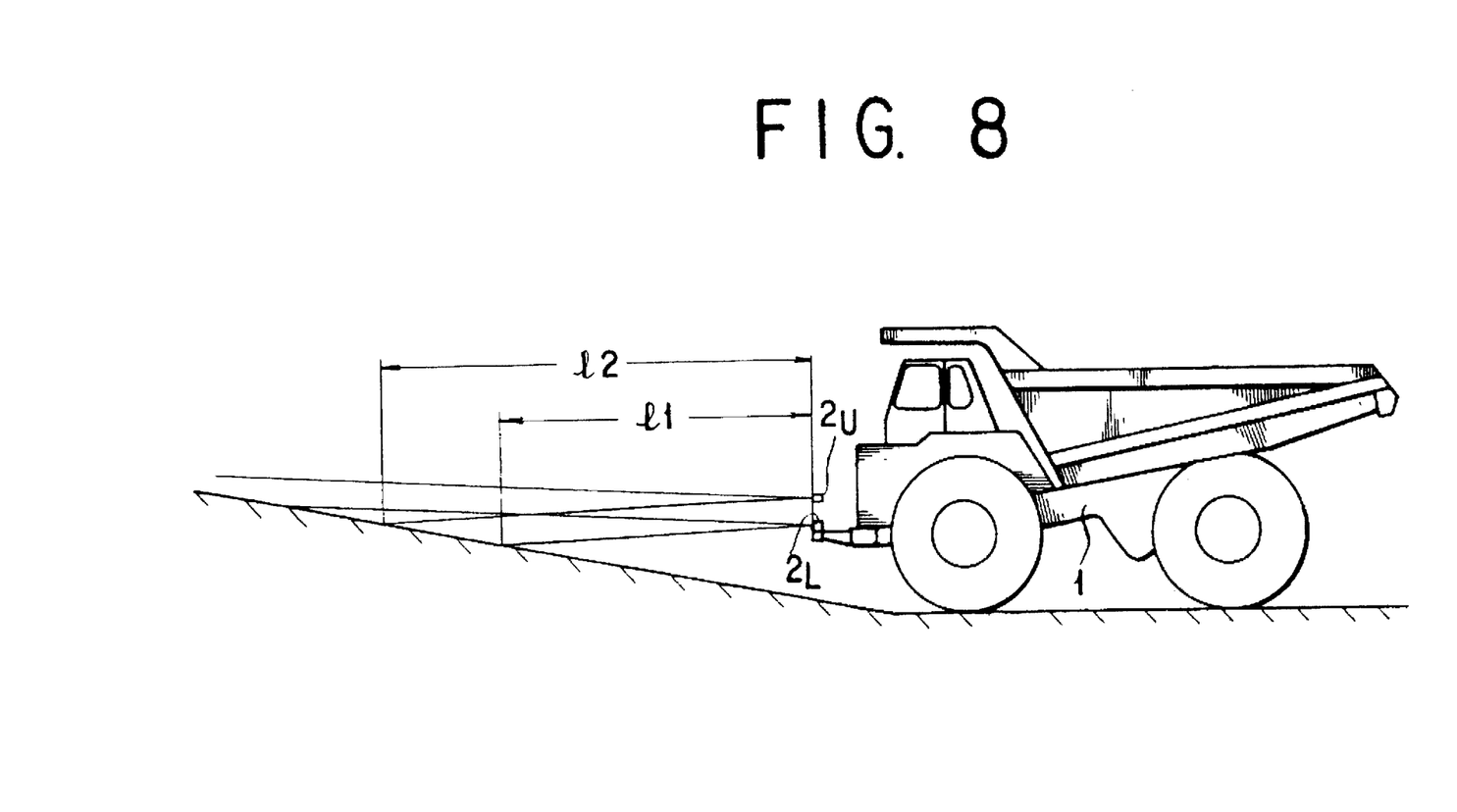
FIG. 8 is an explanatory illustration showing manner of detection of up-hill employing dual preview sensors.

FIG. 8 shows an alternative in distinguishing the slopped ground from the obstacle in the preferred embodiment of the collision preventing system. In order to enable distinction, a first laser type preview sensor $2_U$ and a second laser type preview sensor $2_L$ are mounted at the front side of the vehicular body at mutually different height. In practice, the first preview sensor $2_U$ is positioned at higher position than the second preview sensor $2_L$ as shown. In this case, distinction of the slopped ground from the obstacle can be performed on the basis of a difference of the distances to the obstacle detected by two preview sensors $2_U$ and $2_L$.

For instance, at the bottom of the slopped ground as shown in FIG. 8, two preview sensors $2_U$ and $2_L$ detect different points on the slopped ground through reflected laser beams therefrom. Assuming that the distance detected by the first preview sensor $2_U$ is $l_1$ and the distance detected by the second preview sensor $2_L$ is $l_2$, since the distances $l_1$ and $l_2$ to the obstacle detected by the preview sensors $2_U$ and $2_L$ should be substantially equal to each other when the obstacle standing substantially up-right fashion on the flat plate where the vehicle is traveling. Therefore, the difference $(l_1-l_2)$ of the detected distances at different high position of the preview sensors $2_U$ and $2_L$ indicate the slopped ground. Therefore, when the difference $(l_1-l_2)$ becomes greater than a predetermined distance, judgement can be made whether the obstacle is detected or, alternatively, the slopped ground is detected. Therefore, similarly to the foregoing manner, the slopped ground can be successfully traversed.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A collision preventing system for a vehicle having a brake system, comprising:

first preview sensor means provided at a front end of a vehicular body for detecting an obstacle in front of the vehicle in a first distal detection zone, said first preview sensor means producing a first signal indicative of the presence of an obstacle and distance between the obstacle and the front end of the vehicle;

second preview sensor means provided at the front end of said vehicular body for detecting an obstacle in front of the vehicle in a proximal detection zone, said second preview sensor means producing a second signal indicative of at least the presence of said obstacle;

vehicle speed sensor means for detecting vehicular traveling speed and generating a vehicle speed indicative signal; and control means, having a pre-programmed route programmed therein, connected to said first and second preview sensor means for receiving said first and second signals and connected to said vehicle speed sensor means for receiving said vehicle speed indicative signal, determining whether said obstacle is present on said pre-programmed traveling route and selecting a vehicular deceleration pattern for stopping the vehicle without colliding on an obstacle on the basis of the distance between the obstacle and the front end of the vehicle and the vehicle speed indicated by said vehicle speed indicative signal, only if said obstacle is determined to be on said pre-programmed traveling route;

said control means being responsive to said second signal for operating said brake system for instantly stopping the vehicle.

2. A collision preventing system for a vehicle having a brake system, comprising:

first preview sensor means provided at a front end of a vehicular body for detecting an obstacle in front of the vehicle in a first distal detection zone, said first preview sensor means producing a first signal indicative of a presence of an obstacle and distance between the obstacle and the front end of the vehicle;

second preview sensor means provided at the front end of said vehicular body for detecting an obstacle in front of the vehicle in a proximal detection zone, said second preview sensor means producing a second signal indicative of at least presence of said obstacle;

vehicle speed sensor means for detecting vehicular traveling speed and generating a vehicle speed indicative signal;

control means connected to said first and second preview sensor means for receiving said first and second signals and connected to said vehicle speed sensor means for receiving said vehicle speed indicative signal, and being responsive to said first signal for deriving a vehicular deceleration pattern for stopping the vehicle without colliding on an obstacle on the basis of the distance between the obstacle and the front end of the vehicle and the vehicle speed indicated by said vehicle speed indicative signal, and responsive to said second signal for operating said brake system for instantly stopping the vehicle; and which further comprises a touch sensor means projecting from the front end of said vehicular body for detecting an obstacle contacting thereto and producing a contacting obstacle detection signal, and wherein said control means is responsive to said contacting obstacle detection signal for operating said brake system for instantly stopping.

3. A collision preventing system as set forth in claim 1, wherein said first distal detection zone of said first preview sensor means is elongated in a longitudinal direction of the vehicle.

4. A collision preventing system as set forth in claim 3, wherein said first distal detection zone of said first preview sensor means has a narrower lateral width than a width of said vehicular body.

5. A collision preventing system as set forth in claim 4, wherein said first preview sensor means employs a laser beam diffused over said first distal detection zone as a detecting medium.

6. A collision preventing system as set forth in claim 1, wherein said second proximal zone of said second preview sensor is elongated in lateral direction in an area near the front end of the vehicle.

7. A collision preventing system as set forth in claim 6, wherein said second preview sensor employs an ultrasonic wave spread over said second proximal detection zone as a detection medium.

8. A collision preventing system for a vehicle having a brake system, comprising:

first preview sensor means provided at a front end of a vehicular body for detecting an obstacle in front of the vehicle in a first distal detection zone, said first preview sensor means producing a first signal indicative of a presence of an obstacle and distance between the obstacle and the front end of the vehicle;

second preview sensor means provided at the front end of said vehicular body for detecting an obstacle in front of the vehicle in a proximal detection zone, said second preview sensor means producing a second signal indicative of at least presence of said obstacle;

vehicle speed sensor means for detecting vehicular traveling speed and generating a vehicle speed indicative signal;

control means connected to said first and second preview sensor means for receiving said first and second signals and connected to said vehicle speed sensor means for receiving said vehicle speed indicative signal, and being responsive to said first signal for deriving a vehicular deceleration pattern for stopping the vehicle without colliding on an obstacle on the basis of the distance between the obstacle and the front end of the vehicle and the vehicle speed indicated by said vehicle speed indicative signal, and responsive to said second signal for operating said brake system for instantly stopping of the vehicle; and which further comprises means for distinguishing up-hill ground from obstacle on the basis of a variation of the distance between an obstacle and the front end of the vehicle relative to a traveling distance for avoiding erroneous detection of the obstacle upon detection of the up-hill ground.

9. An obstacle detection system for a vehicle comprising:

preview sensor means provided at a front end of a vehicular body for detecting an obstacle in front of the vehicle, said preview sensor means producing a detection signal indicative of a distance to the detected obstacle;

means for monitoring a traveling distance of the vehicle; and means for distinguishing the obstacle from up-hill ground on the basis of a variation of the distance to said obstacle relative to the traveling distance of the vehicle causing said variation, said distinguishing means producing an obstacle detection signal when a difference between a magnitude of variation of the distance to said obstacle and said traveling distance of the vehicle exceeds a predetermined value, and whereby said means for distinguishing the obstacle from up-hill ground avoids erroneous detection of the obstacle upon detection of the up-hill ground for higher reliability of obstacle detection.

10. An obstacle detection system for a vehicle comprising:

preview sensor means provided at a front end of a vehicular body for detecting an obstacle in front of the vehicle, said preview sensor means including a first sensor positioned at a first elevation and a second sensor positioned at a second elevation lower than said first elevation, said first and second sensor s independently detecting obstacle for producing first and second obstacle distance signals indicative of respective distance to said obstacle; and means for comparing said first and second obstacle distance signals for distinguishing the obstacle from an up-hill ground, said comparing means producing an obstacle detection signal when a difference between said first and second obstacle distance signals is less than a predetermined value.

11. A collision preventing system for a vehicle having a brake system, comprising:

first preview sensor means provided at a front end of a vehicular body for detecting an obstacle in front of the vehicle in a distal detection zone, said first preview sensor means producing a first signal indicative of presence of said obstacle and distance between an obstacle and the front end of the vehicle;

second preview sensor means provided at the front end of said vehicular body for detecting an obstacle in front of the vehicle in a proximal detection zone, said second preview sensor means producing a second signal indicative of at least presence of an obstacle;

vehicle speed sensor means for detecting vehicular traveling speed and generating a vehicle speed indicative signal;

control means connected to said first and second preview sensor means for receiving said first and second signals and to said vehicle speed sensor means for receiving said vehicle speed indicative signal, responsive to said first signal for deriving vehicular deceleration characteristics for stopping the vehicle without colliding on an obstacle on the basis of the distance between an obstacle and the front end of the vehicle and the vehicle speed indicated by said vehicle speed indicative signal, and responsive to said second signal for operating said brake system for instantaneous stopping of the vehicle; and means for distinguishing an up-hill in front of the vehicle from the obstacle on the basis of difference to detected distance to an obstacle at different positions.

12. A collision preventing system as set forth in claim 11, wherein said distinguishing means is incorporated in said first preview sensor means, comprising:

a preview sensor means for detecting obstacle in front of the vehicle, said preview sensor means producing said first signal indicative of a distance to a detected obstacle;

means for monitoring traveling distance of the vehicle; and means for distinguishing an obstacle from up-hill ground on the basis of a variation of the distance to an obstacle relative to the vehicular traveling distance causing said variation, said distinguishing means producing an obstacle detection signal when a difference between a magnitude of variation of the distance to an obstacle and said vehicular traveling distance exceed a predetermined value, and whereby said means for distinguishing the obstacle from up-hill ground avoids erroneous generation of said first signal upon detection of the up-hill ground for higher reliability of obstacle detection.

13. A collision preventing system as set forth in claim 11, wherein said distinguishing means is incorporated in said first preview sensor means, comprising:

preview sensor means provided at the front end of a vehicular body for detecting an obstacle in front of the vehicle, said preview sensor means including a first sensor positioned at a first higher elevation and a second sensor positioned at a second lower elevation, said first and second sensors independently detecting obstacles for producing first and second obstacle distance signals indicative of respective distance to said obstacle; and means for comparing said first and second obstacle distance signals for distinguishing the obstacle from an up-hill ground, said comparing means producing an obstacle detection signal when a difference between said first and second obstacle distance signals is less than a predetermined value.

14. A collision preventing system as set forth in claim 11, which further comprises a fourth touch sensor means projecting from the front end of said vehicular body for detecting obstacle contacting thereto and producing a contacting obstacle detection signal, and said control means is responsive to said contacting obstacle detection signal for operating said brake system for instant stop.

15. A collision preventing system as set forth in claim 11, wherein said first distal detection zone of said first preview sensor means is elongated in the longitudinal direction of the vehicle.

16. A collision preventing system as set forth in claim 15, wherein said first distal detection zone of said first preview sensor means has a narrower lateral width than the width of said vehicular body.

17. A collision preventing system as set forth in claim 16, wherein said first preview sensor means employs a laser beam diffused over said first distal detection zone as a detecting medium.

18. A collision preventing system as set forth in claim 11, wherein said second proximal zone of said second preview sensor is elongated in lateral direction in the area near the front end of the vehicle.

19. A collision preventing system as set forth in claim 18, wherein said second preview sensor employs an ultrasonic wave spread over said second proximal detection zone as a detection medium.

* * * * *